United States Patent [19]

Archer et al.

[11] 4,029,935
[45] June 14, 1977

[54] TOOLS FOR APPLYING HEAT IN EDGE BANDING OPERATIONS

[75] Inventors: Winfield S. Archer, Levittown; Joseph Trus, Yardley, both of Pa.

[73] Assignee: Blaine G. Greenwell, Honolulu, Hawaii

[22] Filed: May 20, 1975

[21] Appl. No.: 579,146

[52] U.S. Cl. .................................. 219/228; 38/93; 156/577; 156/579; 156/583; 219/214; 219/240; 219/243; 219/258; 219/346

[51] Int. Cl.² .................. H05B 1/00; B30B 15/34; D06F 75/24

[58] Field of Search .......... 219/214, 221, 227, 228, 219/230, 240, 243, 245, 254, 258, 533, 346; 156/577, 579, 582, 583, 545, 574; 38/93, 81, 82, 97; 30/140

[56] References Cited

UNITED STATES PATENTS

| | | | |
|---|---|---|---|
| 1,534,689 | 4/1925 | Cooper | 219/228 |
| 1,708,079 | 4/1929 | Brewer | 219/228 UX |
| 2,179,890 | 11/1939 | Kaplan | 21/258 |
| 2,222,327 | 11/1940 | Walkup | 38/93 X |
| 2,299,322 | 10/1942 | Harter | 38/97 UX |
| 2,403,115 | 7/1946 | Olving | 38/93 X |
| 2,484,566 | 10/1949 | Hiller et al. | 156/579 X |
| 3,098,922 | 7/1963 | Paxton | 219/258 X |
| 3,582,436 | 6/1971 | Bucher | 219/228 UX |
| 3,837,976 | 9/1974 | Davidsson | 156/577 X |
| 3,864,547 | 2/1975 | Ray | 219/346 X |

FOREIGN PATENTS OR APPLICATIONS

| | | | |
|---|---|---|---|
| 537,213 | 2/1922 | France | 219/228 |
| 230,235 | 3/1944 | Switzerland | 219/243 |
| 970,283 | 9/1964 | United Kingdom | 219/228 |

*Primary Examiner*—A. Bartis
*Attorney, Agent, or Firm*—Arthur L. Plevy

[57] ABSTRACT

A heating tool is capable of being held in the hand of a user and comprises a handle portion contiguous with a barrel portion. The barrel portion includes a front hollow housing section having an aperture. The aperture is covered by a removeable heat conducting plate or platen and located in the hollow is a source of heat radiation for radiating said plate to raise the temperature thereof to a level sufficient to melt a hot melt adhesive associated with a tape to be applied to a surface.

10 Claims, 8 Drawing Figures

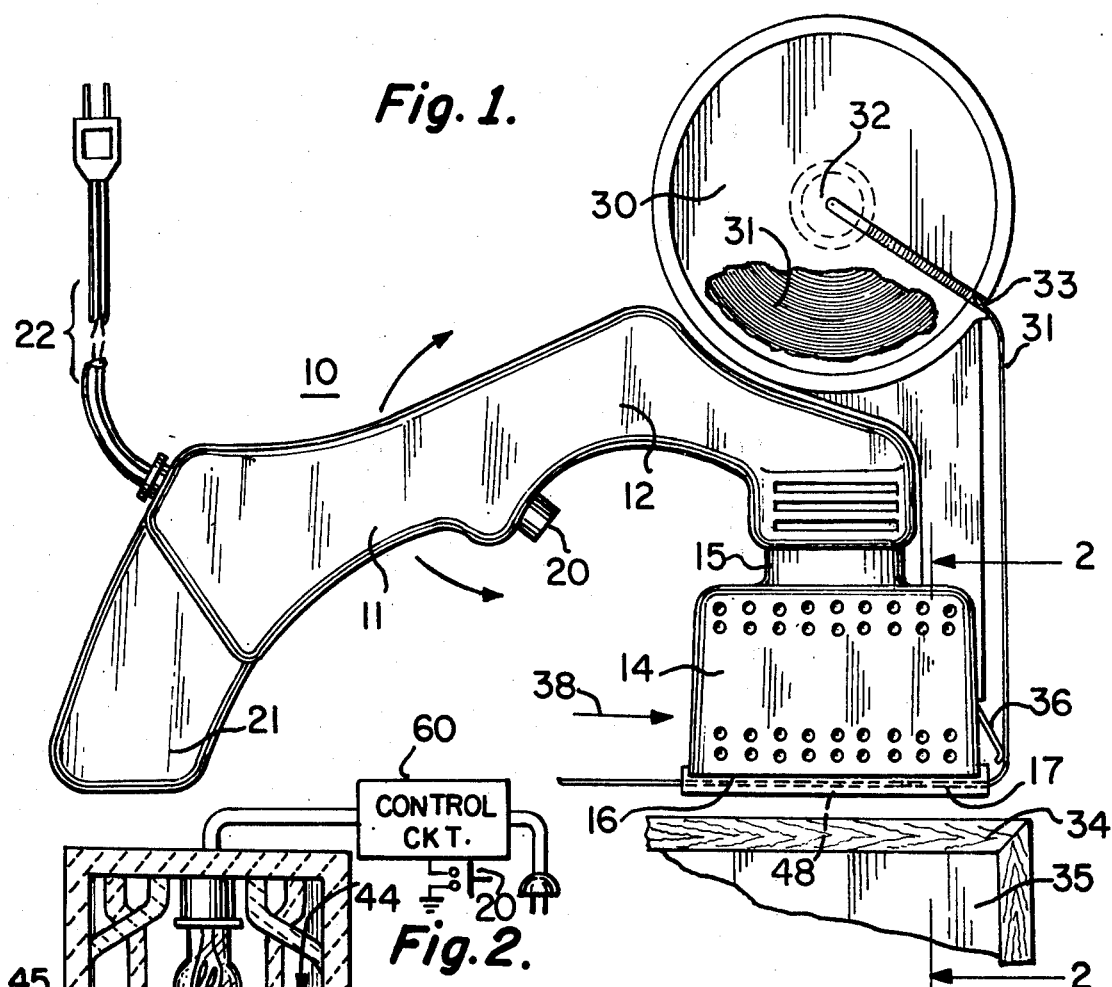
Fig. 1.
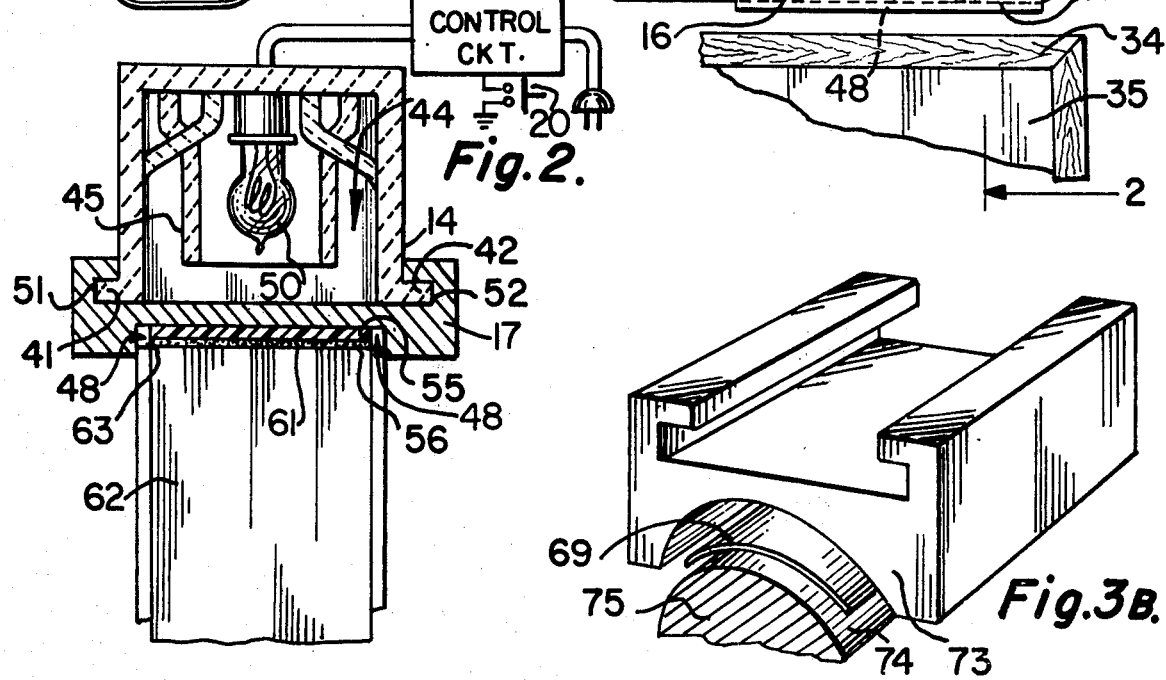
Fig. 2.
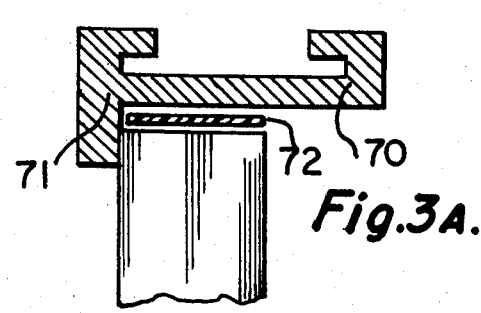
Fig. 3A.
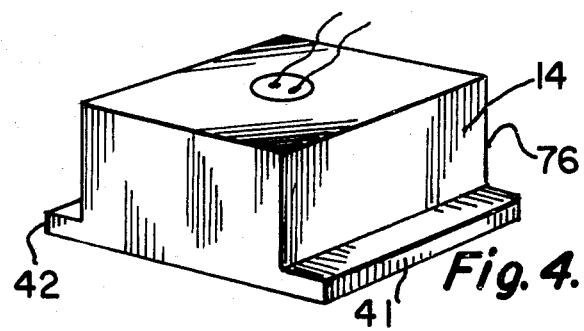
Fig. 3B.
Fig. 4.

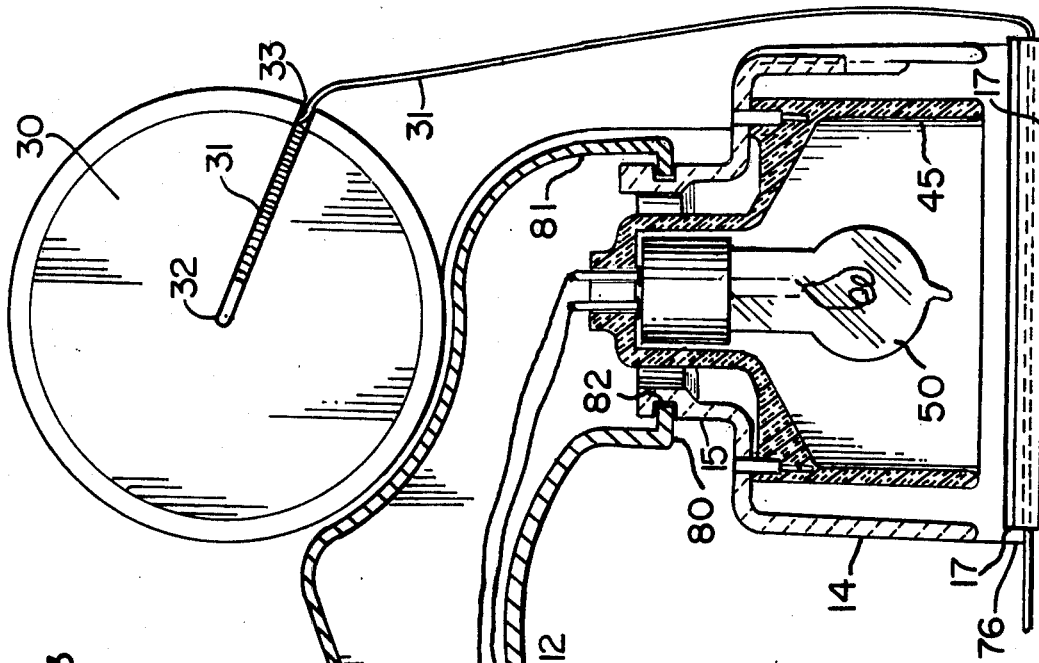
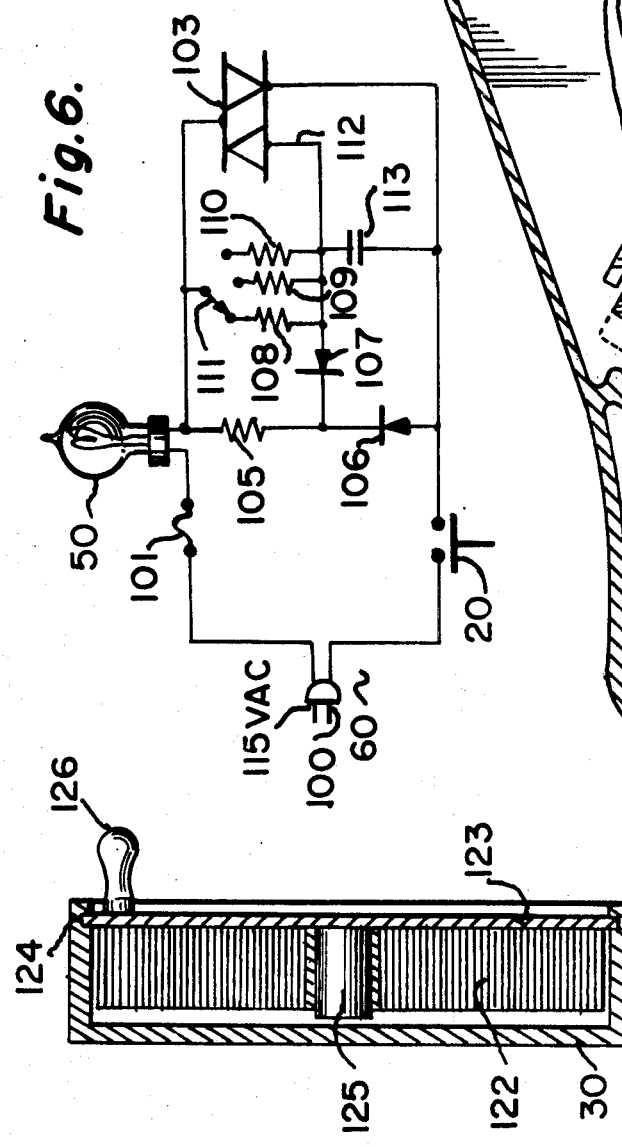
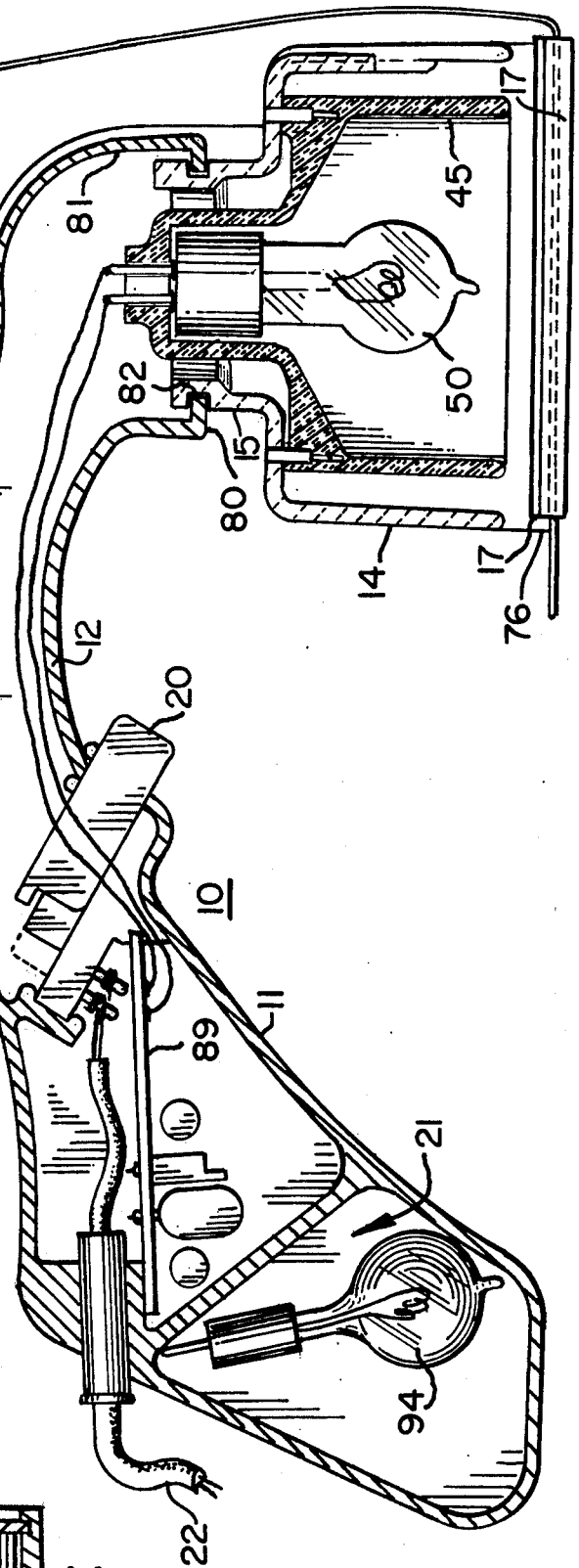

1

TOOLS FOR APPLYING HEAT IN EDGE BANDING OPERATIONS

BACKGROUND OF THE INVENTION

This invention relates to a heating gun particularly adapted to be used in an edge banding process to secure a hot melt adhesive backed tape to a surface.

There previously exists a plurality of products which use the so-called laminated plastic board to fabricate all types of decorative cabinets, surfaces for kitchens, furniture and so on. Usually a laminated plastic surface is applied to a particle board or other medium. The plastic laminates are pre-processed and have attractive patterns impressed or printed thereon, such as woodgrain, bright colors and so on. The plastics are extremely durable and provide good working surfaces and attractive appearances for furniture and so on.

The above panels, when fabricated, typically have exposed edges, which are normally uncovered and detract from the overall appearance of the furniture or cabinet upon which such panels are used.

A very common procedure used prior to final assembly is to cover these exposed edge with a tape having on one surface a hot melt adhesive. These tapes are supplied in identical colors and patterns as in the plastic and have the pattern on one surface and a hot melt adhesive on the other. The process of placing the tape on the edges of the laminated plastic board is referred to as edge banding. The tapes are referred to as panel edging tapes and are available, as indicated, in a wide variety of designs and widths. Such tapes, for example, are available from the WOODTAPE COMPANY of Seattle, Wash., as well as others.

In order to apply the tape to a given edge, one must melt the glue while further assuring that the tape is directed along the edge to be covered. There are machines which operate to do so. Such apparatus' are referred to as edge banding machines and are relatively large while employing heating rods or heating elements as those employed in soldering irons and the like. They are difficult to use and are difficult to repair and maintain. Certain of these machines use a rotating cylinder which is heated and the edge of the panel is pressed against the tape and the cylinder to secure the same to the edge. This procedure requires skill of the operator, who is trained to work with the machine. The machines known to the prior art are large and are referred to as table or bench models.

It is therefore an object of this invention to provide an improved machine or tool, which is portable and adapted to be hand held by a user while providing an efficient heating mechanism and reliable guide means to enable a relatively unskilled operator to perform an edge banding process.

BRIEF DESCRIPTION OF PREFERRED EMBODIMENT

A tool particularly adapted for accommodating an edge-banding operation employing a tape having a surface thereof, a hot melt adhesive for covering an edge with said tape, comprising of a heat conducting platen having a bottom surface adapted to accommodate a given edge contour and heating means for indirectly heating said platen by radiation of said top surface of said platen to cause said bottom surface to be raised to a temperature sufficient to melt said adhesive associated with said tape to thereby secure said tape to said edge.

BRIEF DESCRIPTION OF DRAWINGS

FIG. 1 is a side elevational view of a heating tool according to this invention.

FIG. 2 is a cross sectional view taken through line 2—2 of FIG. 1.

FIG. 3A is a front view of a particular shaped platen.

FIG. 3B is a perspective view of another platen.

FIG. 4 is a perspective view of a housing used in the invention.

FIG. 5 is a cross sectional view of a heating tool according to the invention.

FIG. 6 is a schematic diagram of a control circuit useful in energizing an infra-red heating source.

FIG. 7 is a cross sectional view of a tape dispenser.

DETAILED DESCRIPTION OF DRAWINGS

Referring to FIG. 1, there is shown a side elevational view of a heating tool 10 according to this invention.

The tool 10 is adapted for hand use and includes a handle portion 11, which may be integrally formed or separately attached to a barrel assembly 12. The barrel assembly 12 is rotatably coupled to a front section or rectangular housing 14. The rotational coupling is provided by a swivel joint 15 at the juncture between the housing 14 and the barrel assembly 12.

The housing 14 has an opened bottom end 16, which is covered by a selectively removable platen or plate member 17. The housing 14 is hollow and as will be explained, includes a heating source as an infra-red lamp. The lamp radiates heat to the platen 17 to heat the same to a desired temperature. The operation of the lamp, which may be an infra-red lamp is controlled by a trigger switch 20, located on the handle portion 11 of the "gun-type" tool 10.

The barrel portion 12 and the housing 14 contain air circulating apertures such as louvres or holes as indicated, to permit reliable operation of the tool and for cooling the components.

A storage compartment 21 is shown coupled to one end of the handle assembly 11 and serves to store an extra bulb or any other component as a fuse and so on. The compartment section may be slideably removed by means of a typical flange coupling scheme between the handle portion 11 and the edge of the compartment 21. The unit or tool 10 is energized from the 60 cycle AC line and thus, a line cord and plug assembly 22 are provided.

Also shown coupled to the front of the barrel portion 12 of the tool 10 is a tapered dispenser 30.

The dispenser 30 contains a roll 31 of a predetermined diameter of a hot melt adhesive backed laminate tape, as above indicated.

The dispenser 30 has an internal hub 32 and the roll of tape is placed thereon and can rotate with respect to the dispenser 30 about the hub 32. The tape is directed through an opening 33 in the dispenser 30 along a path as shown so that the tape rides in a slot aperture or channel on the bottom surface of the platen 17 with the adhesive backed side facing the edge 34 of the particle board 35 to be edge banded.

As will be explained, the tape path is such that it coacts with the surface of a spring member 36 prior to entering the channel 37 in the platen 17.

The function of the spring member 36, which may be fabricated from a spring steel, heat resistant plastic or some other material, is to prevent the tape 31 from being cut or torn by the relatively sharp or roughened edge of the platen 17.

Before proceeding with a more detailed description, one can ascertain operation of the unit 10 by viewing FIG. 1, as follows:

An operator grasps the gun 10 by means of the handle section 11. The tape dispenser 30 is filled with a predetermined amount of tape and the user directs the tape 31 so it rides in the channel 48 of the heat conducting platen member 17. The platen member 17 may be fabricated from a good heat conducting material, as a metal or metal alloy, such as a steel alloy and so on.

The operator then positions the gun so that the channel 37 of the platen 17 rides over the edge 34 to be banded. Thus, the tape 31 is between the platen 17 and the edges 34. The adhesive backing faces the edges 34. The operator then presses the trigger 20 to energize the heat source in housing 14, while pushing the unit 10 in the direction shown by arrow 38. The force due to weight of the gun 10 and the user's pushing action plus the heat generated for melting the adhesive assures a good bond between the edge 34 of the laminated board 35 and the tape 31.

Since the barrel portion and the housing are rotatable due to the swivel joint 15, the user can follow any edge contour. Since the bolt 10 is hand held, internal edges can be banded as well as external edges and a great variety of contours and surfaces can be accommodated due to the fact that the entire unit 10 is portable and hand held.

Referring to FIG. 2, there is shown a front cross sectional view taken through line 2—2 of FIG. 1 to more clearly indicate the operation and the configuration of components.

Basically, the front housing 14 is rectangular in configuration and is fabricated from a good insulative or heat resistant material, as a porcelain and so on. The housing 14 has two side flanges 41 and 42 adapted to accommodate coacting channels 51 and 52 in the heat conducting platen member 17.

The housing 14 has an internal hollow 44 for accommodating a second housing 45. Housing 45 may be secured to housing 14 by means of a typical screw assembly or integrally formed. Housing 45 surrounds an infra-red heat source 50, which comprises an infra-red bulb. Such bulbs as 50 are available from a number of manufacturers, such as the General Electric Corporation and provide 600 watts or infra-red power at 120 volts, 60 Hz operation. An example of a suitable bulb is the General Electric model DYH-600. The bulb 50 is energized via a control circuit 60, which is operated by the switch 20 to apply a preselected amount of power from the AC line to the bulb 50.

The platen 17, as indicated, is a good heat conductor and slides on the flange 41 and 42 of housing 14 via the channels 51 and 52. The bottom surface of the platen 17 has a central channel 48, which is dimensioned according to the width of an edge 61 of a plastic laminated board 62 to be bonded.

The channel 48 enables a user to assure that the tape 55 is always properly aligned and hence, the channel 48 serves as a guide for the tape 55. As shown in FIG. 2, the tape 55 is fed with the adhesive contacting surface 61 of the board 62.

The operator pushes the tool and applies pressure along the edge 61. When the operator energizes switch 20, the lamp 50 is turned on. Heat is produced immediately due to the nature of the infra-red lamp and infra-red heat. The heat is transferred by radiation to the plate or platen 17. The material of the platen 17 between the lamp source 50 and the channel 48 is relatively thinner than the peripheral edges of the platen and heats up rapidly and sufficiently to melt the adhesive backing 56 of the tape 55 securing the tape 55 with the finished surface facing outwardly to the edge 61 of the board 62.

FIGS. 3A and 3B show a platen member as 17 of FIG. 2, with different aperture and channels for accommodating different shaped edges.

Particularly, FIG. 3A shows a platen 70 having a single bottom flange 71 for performing a similar edge band operation as shown in FIG. 2 by an operator relying on a single flange 71 as a guide.

A tape as 72 is shown positioned for application

FIG. 3B shows a platen 73 with a rounded contour to accommodate a rounded edge as 74 of a board 75. The tape 69 will of course, conform to the surfaces as shown and be properly emplaced.

FIG. 4 shows a perspective view of the housing as 14 of FIG. 2, to clearly show the nature of the flanges as 41 and 42. The rear wall 76 of the housing 14 may be slightly lower than the front wall to project below flanges 41 and 42 and thus act as a stop to prevent a platen, when emplaced, from sliding off the flanges.

It should be clear from the above description that any platen as 17, 70, 73 can be quickly removed and replaced by the user as a function of the edge bonding operation to be implemented. It should also be clear that a wide variety of platens of many alternate surface configurations, including platens without channels, can be used and accommodated accordingly.

Referring to FIG. 5, there is shown a side cross sectional view of the hand held tool.

The swivel joint 15 is relatively simple in structure and as indicated, the barrel portion 12 has a peripheral flange 80, which rides in a circular groove 82 in the outer housing 14. This enables rotation of the barrel and handle sections of the unit with respect to the front housing assembly 14.

The trigger 20 is shown and is finger operated to energize the lamp 50 in the inner housing 45 when depressed.

A printed circuit board 89 is located in the handle assembly and contains the control circuit components for selectively energizing the lamp 50 for efficient heat transfer to the platen 17.

Also shown is the storage compartment 21 containing a spare lamp 94. The storage compartment 21 can be removeably coupled to the handle section of the unit by a number of common techniques.

FIG. 6 shows a schematic diagram of the control circuitry for the infra-red heat source as lamp 50 of FIG. 2.

The circuit is a commonly used control circuit and operates as follows:

Power from AC line is applied via line cord 100, one side is coupled through a protective fuse or circuit breaker 101, and is applied to one terminal of an infra-red lamp 50. The other terminal of the lamp 50 is coupled to a terminal of a triac or back to back silicon controlled rectifier assembly 103. The triac assembly 103 is a conventional component sold by a number of manufacturers.

The other terminals of the triac 103 is coupled to the other terminal of the AC line via a switch 20. In parallel with the triac 103 is a timing circuit, including a resistor 105, two diodes 106 and 107, and three or more switch selectable resistors 108, 109, 110 which can be selected by a switch 111, to determine the amount of power supplied to the lamp 50. The junction between the selected resistor and capacitor 106 is coupled to the gate or control electrode 112 of the triac 103.

Operation is as follows:

The capacitor 113 charges according to the value of the resistor selected and when it fully charges, the triac is turned off, presenting a high impedance. During charging the triac 103 is on and a low impedance is presented across the terminals causing the lamp 50 to be energized, if switch 20 is closed to complete the series circuit.

By selecting the resistor as 108, 109 or 110, one therefore affects the duty cycle of the circuit and hence, the waveform is applied to the lamp 50. For full 60 cycles power, the lamp provides 600 watts, if the duty cycle was changed, the wattage produced would be less and therefore, the heat radiated would be less, thus enabling one to control the platen temperature according to the selection of a resistor by switch 111.

FIG. 7 shows a cross sectional view of a typical tape dispenser 30. Basically, the dispenser 30 has two parts, one part is a housing member 121 to house the tape roll 122. A cover member 123 sits in a peripheral groove 124 in member 120. The cover member has a hub 125 for accommodating the roll of tape which is generally annular in shape. A handle 126 is coupled to the surface of member 123 and allows the operator to wind one length of tape desired about the hub 125. Many other dispenser configurations are evident.

In summation, there is disclosed a tape applicating gun for providing radiated heat to a platen and hence, to a tape. A guide mechanism is incorporated in the platen to enable an operator to follow any edge contour and to edge band both external and internal contours. There is no mechanical coupling of a heat source to a platen and hence, the unit is easy to build, reliable and the platens can be selectively replaced with great ease to enable one to accommodate a great deal of edge banding operations.

Other modifications and arrangements should be clear to those skilled in the art and such modifications are deemed to be encompassed with the claims appended hereto.

We claim:

1. A hand held heating tool particularly adapted for accommodating an edge banding operation, wherein a tape having a hot melt adhesive backing is emplaced to cover an exposed edge of a surface of a panel with said tape, comprising:
   a. a housing including a handle portion for grasping of the same by a user,
   b. a barrel portion rotatably coupled to said housing and having a front section relatively transverse to said handle portion, said front section of said barrel portion having a bottom aperture communicating with an internal hollow within said front section,
   c. placement means coupled to said front section of said barrel portion and positioned about the periphery of said aperture,
   d. a heat conducting platen dimensioned to cover said aperture and having a top surface including means adapted to coact with said placement means to removably position said platen to cover said aperture, and a bottom surface including a predetermined shaped guide channel for enabling said tool to be moved along said edge to be banded,
   e. tape dispensing means coupled to said housing and positioned such that a tape accommodated by said means is directed within said guide channel with said hot melt adhesive backing facing said edge, and
   f. radiant heating means located in said hollow of said housing to transfer heat to said top surface of said platen and therefore to said bottom surface by radiation to heat said platen to a temperature sufficient to melt said adhesive, whereby due to said radiation, said platen can be removed and replaced when desired.

2. The heating tool according to claim 1 wherein said placement means coupled to said front section of said barrel comprises a first and second flange, said flanges being positioned along opposite sides of said front section and said coacting means on said platen comprising first and second channels on said top surface for coacting with said flanges to retain said platen in a position to cover said aperture.

3. The hand held tool according to claim 1 wherein said guide channel on said bottom surface of said platen is a relatively U-shaped transverse cross section.

4. The hand held tool according to claim 1 wherein said guide channel on said bottom surface of said platen is of a semicircular transverse cross section.

5. A hand held heating tool particularly adapted for accommodating an edge banding operation, wherein a tape having a hot melt adhesive backing is emplaced to cover an exposed edge of a surface, comprising:
   a. a hollow housing fabricated from an insulative material and having top and side surfaces with an open bottom surface, said top surface having an aperture located thereon,
   b. a hollow elongated handle section rotatably coupled to said top surface and communicating with said aperture on said top surface of said hollow housing,
   c. a first flange member positioned on one side of said housing near said bottom surface and a second flange member positioned on an opposite side of said housing near said bottom surface, said flanges being relatively parallel,
   d. a heating conducting platen having a top and a bottom surface and dimensioned to cover said open bottom, said top surface including two parallel coupling channels at opposite sides and positioned on said top surface to slideably coact with said flanges on said housing to removably position said platen to cover said opened bottom, a guide channel located on said bottom surface and positioned relatively parallel to and between said coupling channels,
   e. a source of infra red radiation located in said hollow housing for heating said platen by radiation to enable easy removal of said platen,
   f. means located in said elongated handle portion for controlling the intensity of said radiation and therefore the heating of said platen, and
   g. dispensing means coupled to said tool for positioning a tape wtihin said guide channel with said adhesive backing facing said surface to cause said backing to melt according to said radiated heat.

6. The heating tool according to claim 5 wherein said guide channel is relatively of a U-shaped transverse cross sectional configuration.

7. The heating tool according to claim 5 wherein said guide channel is manifested by at least one downwardly extending flange located across one side of said bottom surface of said platen.

8. In a hand held heating tool of the type particularly adapted to accommodate an edge banding operation, said tool includng a hollow housing having an opened bottom surface with a hand graspable handle assembly extending from a top surface of said housing, said hollow housing having located therein a source of radiant heat positioned to radiate heat towards said opened bottom of said housing, the improvement therewith of apparatus for selectively collecting said heat for directing the same to melt an adhesive on a surface of a tape to cover an exposed edge of a panel, comprising:
 a. placement means located on said housing,
 b. a heat conducting platen having a top surface including peripheral means on said top surface adapted to coact with said placement means to selectively removably position said platen to said housing in a position to cover said opened bottom surface, said platen including a guide channel on a bottom surface and located beneath said radiant heat source, said channel of a configuration selected solely according to said edge of said panel to be covered by said tape to enable said edge to be tranversed by said platen when moving said tool, said channel on said bottom surface being of a given thickness selected to enable a maximum amount of radiated heat to be trasferred to said platen in the area of said channel with said platen being substantially thicker in all regions adjacent said channel, whereby any one of a number of platens with different guide channels according to different edges to be covered, can be accommodated due to said heat by radiation of said platen.

9. The hand held heating tool according to claim 8 wherein said guide channel is relatively of a U-shaped transverse cross section.

10. The hand held heating tool according to claim 8 wherein said source radiant heat includes an infra red lamp.

* * * * *